United States Patent
Subrahmanyam et al.

(10) Patent No.: US 12,553,627 B2
(45) Date of Patent: Feb. 17, 2026

(54) METHODS AND SYSTEMS FOR AIR PURIFICATION

(71) Applicant: WOWBREEZE, LLC, Irving, TX (US)

(72) Inventors: Susarla Subrahmanyam, Irving, TX (US); Phani Yenugu, Mason, OH (US)

(73) Assignee: WOWBREEZE, LLC, Irving, TX (US)

( * ) Notice: Subject to any disclaimer, the term of this patent is extended or adjusted under 35 U.S.C. 154(b) by 348 days.

(21) Appl. No.: 18/468,093

(22) Filed: Sep. 15, 2023

(65) Prior Publication Data

US 2025/0093057 A1    Mar. 20, 2025

(51) Int. Cl.

| | |
|---|---|
| *B01D 46/00* | (2022.01) |
| *B01D 46/121* | (2022.01) |
| *B01D 46/44* | (2006.01) |
| *B01D 46/62* | (2022.01) |
| *F24F 8/108* | (2021.01) |
| *F24F 8/158* | (2021.01) |
| *F24F 8/22* | (2021.01) |
| *F24F 8/50* | (2021.01) |
| *F24F 8/80* | (2021.01) |
| *F24F 11/58* | (2018.01) |

(Continued)

(52) U.S. Cl.
CPC .............. *F24F 8/80* (2021.01); *B01D 46/00* (2013.01); *B01D 46/0005* (2013.01); *B01D 46/0027* (2013.01); *B01D 46/121* (2022.01); *B01D 46/442* (2013.01); *B01D 46/62* (2022.01); *F24F 8/108* (2021.01); *F24F 8/158* (2021.01); *F24F 8/22* (2021.01); *F24F 8/50* (2021.01); *F24F 11/58* (2018.01); *F24F 11/72* (2018.01); *F24F 2110/64* (2018.01)

(58) Field of Classification Search
CPC .............. B01D 46/00; B01D 46/0002; B01D 46/0005; B01D 46/0027; B01D 46/121; B01D 46/442; B01D 46/62
See application file for complete search history.

(56) References Cited

FOREIGN PATENT DOCUMENTS

| | | | |
|---|---|---|---|
| CN | 203634972 U | * 6/2014 | |
| KR | 20090001336 U | * 2/2009 | ......... B01D 46/4254 |

OTHER PUBLICATIONS

HEPA Air Purifier—HEPA Air Purifier Units with UV Light—Indoor Gun Range Ventilation—https://www.gunrangeventilation.com/hepa-filter-uv-light-units/—(first downloaded on or around May 20, 2023).

(Continued)

*Primary Examiner* — Robert A Hopkins

(74) *Attorney, Agent, or Firm* — Quarles & Brady LLP

(57) ABSTRACT

An air purifier that includes a front and a rear housing, a power supply that is in communication with a controller, a fan, and an air purifying assembly that is within the rear housing and includes a first air filter, a second air filter, a UV light, an odor absorber, and a fragrance diffuser. Further, the first air filter is restrained vertically within the rear housing using a first set of filter holders that define a first filter holder axis and are attached to a right side and a left side of the rear housing and the second air filter is restrained at an offset angle to the first air filter within the rear housing using a second set of filter holders that define a second filter holder axis and are attached to the right side and the left side of the rear housing.

20 Claims, 11 Drawing Sheets

(51) Int. Cl.
*F24F 11/72* (2018.01)
*F24F 110/64* (2018.01)

(56) References Cited

OTHER PUBLICATIONS

Febreze Spring and Renewal Air Purifier—Febreze Spring and Renewal Air Purifier Scent Refill, FRF102P, 2 Pack—Walmart.com—https://www.walmart.com/ip/Febreze-Spring-and-Renewal-Air-Purifier-Scent-Refill-FRF102P-2-Pack/36855613?from=/search—(first downloaded on or around May 20, 2023).
Febreze Air Purifier—Amazon.com: Febreze HEPA-Type Tower, Medium to Large Room Air Purifier, 25" × 10.2" × 8", White : Home & Kitchen—https://www.amazon.com/Febreze-FHT190W-HEPA-Type-Tower-Purifier/dp/B00OP292QC—(first downloaded on or around May 20, 2023).

\* cited by examiner

METHODS AND SYSTEMS FOR AIR PURIFICATION

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE DISCLOSURE

1. Field of the Disclosure

The present disclosure relates generally to methods and systems for air purification and, more particularly, to systems and methods for purifying air using an air purifier that has an air purifying compartment that contains a first and a second air filter, a UV germicidal light, a fragrance diffuser, and an odor absorber.

2. Description of the Background of the Disclosure

A multitude of air purifiers exist in the marketplace. Many include only a single filter or a dual filter, only use UV light, or only include an odor absorber or a fragrance diffuser. A problem with existing dual-filter air purifiers on the market is that the air purifiers currently on the market generally do not include UV lights, fragrance diffusers, and/or odor absorbers integrated within the air purifiers. To the extent that air purifiers include multiple purifying or other components, larger housings are typically required in order to accommodate all such components, which can make the existing air purifiers unaesthetically pleasing and/or harder to transport and store. Additionally, large air purifying compartments require additional material to manufacture which increases the environmental impact and the cost associated with producing the air purifiers.

SUMMARY OF THE DISCLOSURE

In some aspects, an air purifier may comprise a front and a rear housing that are connected, a power supply that is in communication with a controller, a fan that is in communication with the power supply and located within a fan compartment within the front housing, and an air purifying assembly that is within the rear housing in an air purifying compartment that includes a first air filter, a second air filter, a UV light, an odor absorber, and a fragrance diffuser. In some aspects, the first air filter may be restrained vertically within the rear housing using a first set of filter holders that define a first filter holder axis and are attached to a right side and a left side of the rear housing. In some aspects, the second air filter may be restrained at an offset angle to the first air filter within the rear housing using a second set of filter holders that define a second filter holder axis and are attached to the right side and the left side of the rear housing. In some aspects, the first and the second filter axes may define a filter angle that is nonzero.

In some aspects, the air purifying compartment may have a rectangular cross-section when split across a plane that extends through the front and rear housings of the air purifier. In some aspects, the air purifying rectangular cross-section may comprise a first triangular cross-section and a second triangular cross-section. In some aspects, the first triangular cross-section may be defined by a bottom of the rear housing and the first and second air filters, and the second triangular cross-section may be defined by a top of the rear housing, the second air filter, and a series of cross bars that the fan is mounted to that extend from the top, the bottom, and the right and the left side of the rear housing. In some aspects, the filter angle may be between about 5 and 15 degrees. In some aspects, the filter angle may be between about 8 and 10 degrees. In some aspects, the first air filter and the second air filter may be filters sizes that are commercially available filter sizes. In some aspects, the UV light may be located at a bottom of the air purifying compartment between the first air filter and the second air filter. In some aspects, the controller may have a communication system that is configured to be in communication with a communication network. In some aspects, the controller may be configured to receive data through the communication system from one or more smart home devices that are in communication with the communication network.

In some aspects, an air purification system may comprise an air purifier that may include a controller, a front and a rear housing that may be connected, a fan, an air purifying assembly that may be within the rear housing and that may include a first air filter, a second air filter, a UV light, an odor absorber, and a fragrance diffuser. Further, the air purifier may include an air displacement mechanism that may be within the front housing and may be in communication with the controller, and a power supply that may be in communication with the controller. Additionally, the air purification system may include a communication system that is in communication with the controller, one or more sensors in that may be in communication with the controller, and one or more buttons that may be in communication with the controller. In some aspects, the first air filter may be restrained vertically within the rear housing using a first set of filter holders that may define a first filter holder axis and may be attached to a right side and a left side of the rear housing, and the second air filter may be restrained at an offset angle to the first filter within the rear housing using a second set of filter holders that may define a second filter holder axis and may be attached to the right side and the left side of the rear housing. Further, the first and the second filter axes may define a filter angle that is nonzero, and the communication system may be configured to be in communication with a communication network.

In some aspects, the controller may be configured to receive data from one or more smart home devices through the communication system. In some aspects, a first sensor of the one or more sensors may be a dust sensor. In some aspects, the controller may be configured to use data from the dust sensor to determine an optimal operational cycle for the air purifier. In some aspects, the optimal operational cycle for the air purifier may relate to both an intensity the fan operates at and a length of time the fan operates for during each operational cycle. In some aspects, the controller and the one or more buttons may be located on a smartphone that may be in communication with the communication network. In some embodiments, the communication system may be configured to be in communication with a communication network that is a Wi-Fi network.

In some aspects, a method of operating an air purifier may include the steps of providing an air purifier with a front and rear housing that may be connected to each other, a power supply, a controller, one or more sensors, a fan, and an air purifying assembly that may be within the rear housing in an air purifying compartment that may include a first air filter and a second air filter that may be mounted to the rear housing such that they are disposed at a non-parallel angle from each other, a UV light, an odor absorber, and a fragrance diffuser. Further, in some aspects, the method may also include the steps of initiating the fan for a set amount of time that may be determined by the controller based on an air quality measurement from one or more sensors, operating the fan by using the controller to send power from the power supply to the fan such that the fan pulls air through the air purifying assembly that may have a first, second, third, fourth zone, and stopping the fan by the controller stopping the power to the fan after a set amount of time has elapsed.

In some aspects, the first zone of the air purifier may be an activated carbon air filter, the second zone of the air purifier may be a UV light, the third zone of the air purifier may be a high-efficiency particulate filter, and the fourth zone of the purifier may be a fragrance diffuser and an odor absorber. In some aspects, the controller may also use user inputs from a smartphone when determining an optimal operational cycle. In some aspects, the method may include the step of the air purifier entering a rest state after the controller stops the power to the fan.

DETAILED DESCRIPTION OF THE DRAWINGS

Figure 1:
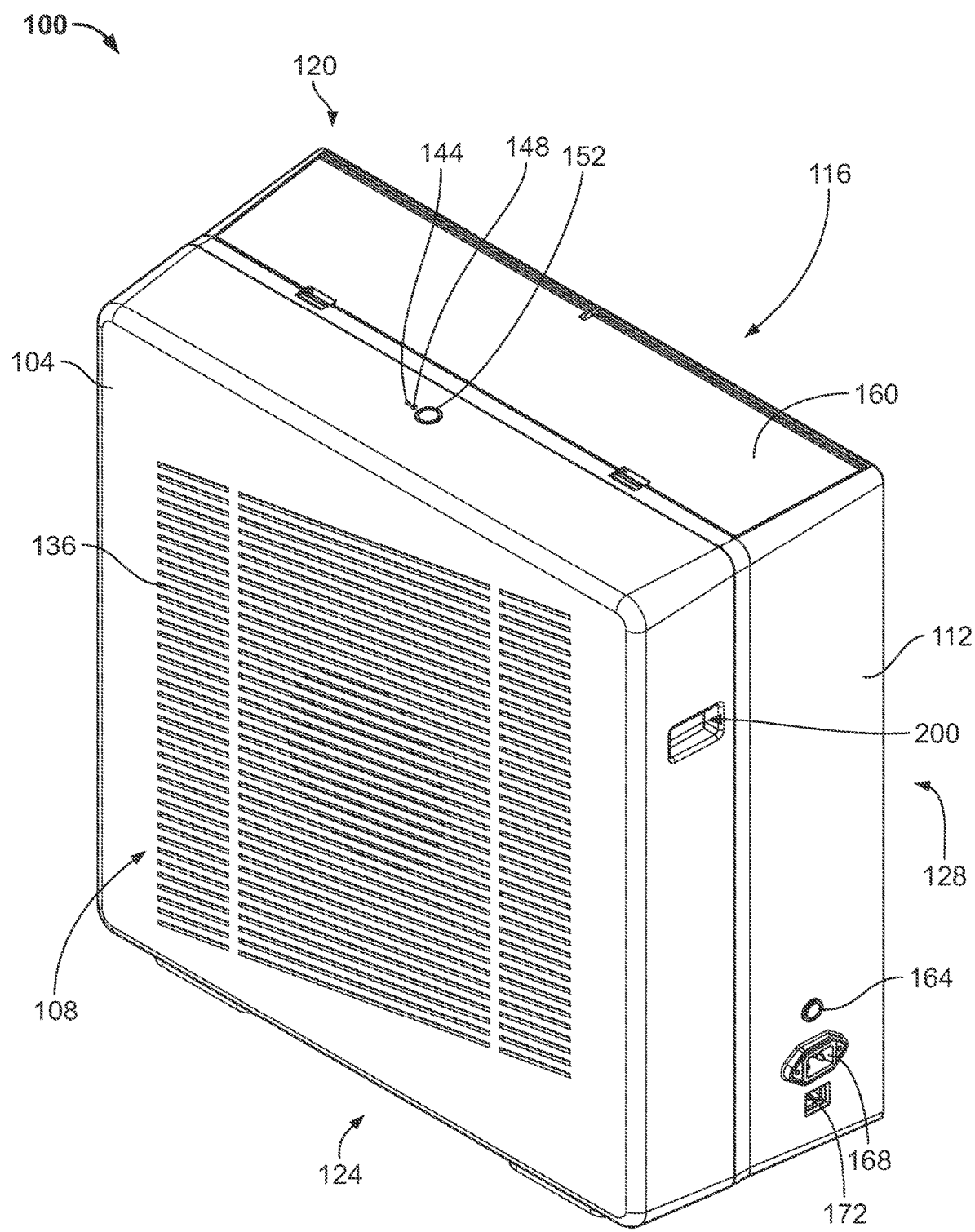
FIG. 1 is a front, top, and right isometric view of an air purifier as disclosed therein.

The present disclosure relates to an air purifier with an air purifying assembly having a first and a second air filter, a UV germicidal light, a fragrance diffuser, and an odor absorber. Further, this disclosure relates to the methods of operation of an air purifier that provide for enhanced air filtration practices using a more aesthetically pleasing, more compact, more economical, and/or more environmentally friendly air purifier when compared to air purifiers known in the art. Additionally, the present disclosure relates to an air purifier that uses a dust sensor to monitor the air quality such that the air purifier can alter its operational cycles. Further, the present disclosure also relates to an air purifier that can be controlled through a smart home device such as a smartphone.

Throughout the disclosure, the terms "about" and "approximately" refer to a range of values±5% of the numeric value that each term precedes. As noted herein, all ranges disclosed within this application are inclusive of the outer bounds of the range. The term "fragrance," as used herein, refers to any substance or a mixture of substances designed to emit an aromatic scent.

Referring to FIGS. 1-4, a top, right, and front isometric view of an air purifier 100 is shown. The air purifier 100 comprises a front housing 104 on a front side 108 of the air purifier 100 that is connected to a rear housing 112 that is opposite of the front side 108 on a rear side 116 of the air purifier 100. The front and rear housings 104, 112 are connected to each other along a top, bottom, right, and left sides 120, 124, 128, 132 of the air purifier 100. The front housing 104 has a plurality of air vents 136 disposed along the front side 108 of the air purifier 100. The rear housing 112 includes a rear housing panel 140 (best shown in FIG. 3) that also has a plurality of air vents 136. On the top 120 of the front housing 104 of the air purifier 100, there is an LED 144, a WIFI reset button 148, and a setting button 152 which are all in communication with a controller 156 that is discussed in more detail below and shown as printed circuit boards in FIGS. 5-8. In some aspects, such as the illustrated aspect, the WIFI reset button 148 is recessed within the front housing 104 such that it does not accidentally get pressed by a user. Positioned behind the buttons 148, 152, on the top 120 of the rear housing 112 is a lid 160 that is pivotably attached to the rear housing 112.

Figure 2:
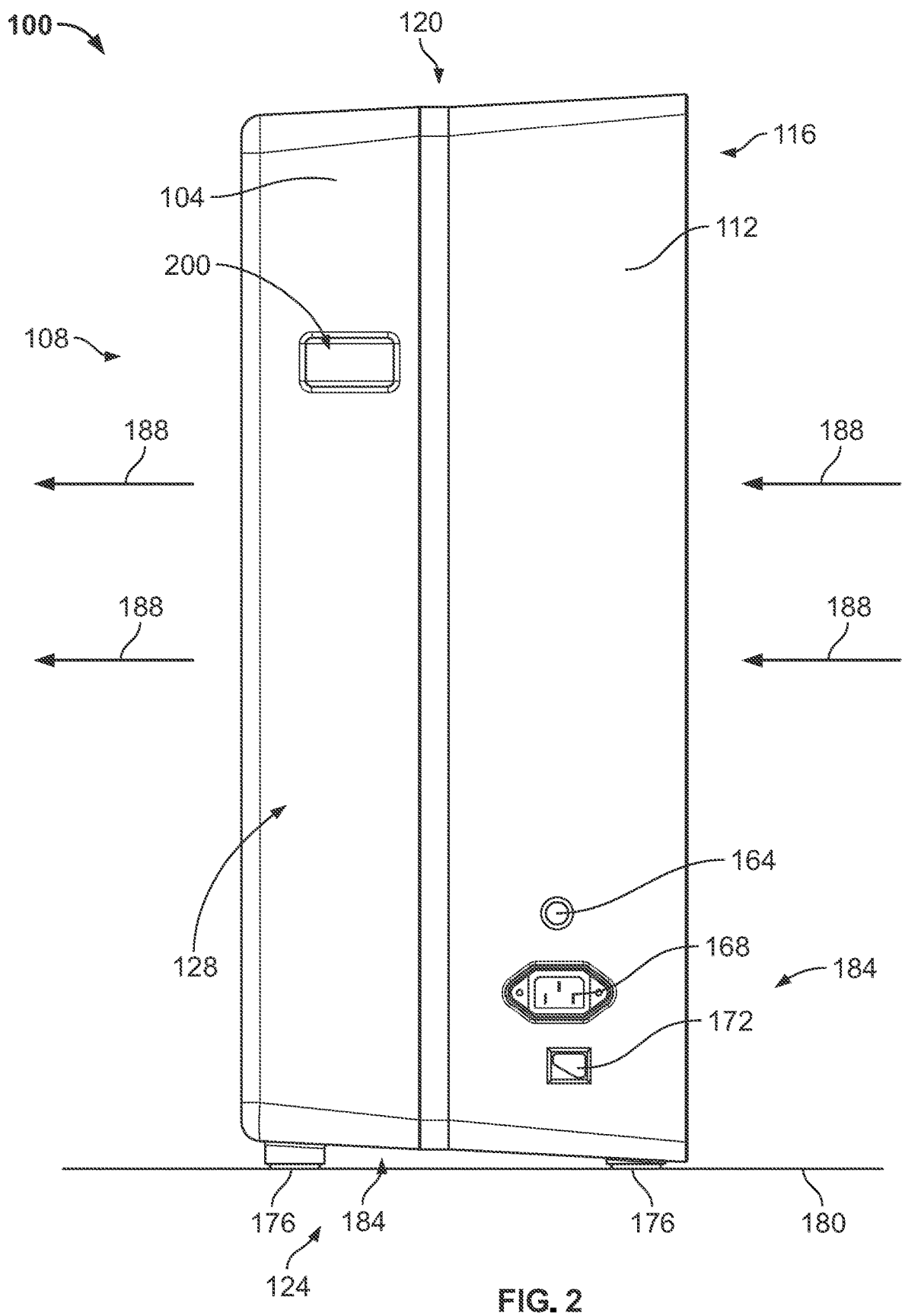
FIG. 2 is a right side view of the air purifier of FIG. 1.

Referring to FIG. 2, a right-side view of the air purifier 100 is shown. Disposed on the right side 128 of the rear housing 112, the air purifier 100 has a power switch 164, a power supply 168 in the form of a power socket, and a dust sensor 172 which are all in communication with the controller 156 which is discussed in more detail below and shown best in FIGS. 5-8. The power supply 168 may be configured to receive a plug such as a USB-C, that can be used to charge or power the air purifier 100. In some aspects, the air purifier 100 may receive power from a wall outlet or another source of power as the power supply 168. In some aspects the power supply 168 may be a battery which could include an internal or external rechargeable battery that may be a one-time use battery, a lead-acid battery, a nickel-cadmium battery, a nickel-metal hybrid battery, a lithium-ion battery, an alkaline battery, a zinc-carbon battery, a coin cell battery, a zinc-air battery, a sealed lead-acid battery, or any other device known in the art that holds energy in the form of chemicals. In some aspects, the power supply 168 may use a combination of battery types and/or the power supply 168 may be a combination of power sources such as a battery and a wall charger. In some aspects, the power supply 168 may implement power conditioning to transform the line voltage into a direct current. In some aspects, the power supply 168 may not implement power conditioning and the line voltage into the air purifier 100 may be alternating current.

Still referring to FIG. 2, the front and the rear housings 104, 112 have feet 176 on the bottom 124 of the air purifier 100 that are configured to support the air purifier 100 in an upright position, i.e., a position where all four feet 176 are in contact with a ground surface 180 that is flat and level, such that a tilt sensor (not shown) can communicate to the controller 156 that the air purifier 100 is in an upright position and that the air purifier 100 is in condition to operate. In some aspects, the tilt sensor (not shown) may communicate to the controller 156 that the air purifier 100 is slightly slanted, but not moving and in a stable state indicating that the air purifier 100 is in condition to operate. In some aspects, the feet 176 may be configured such that there is a gap 184 between the bottom 124 of the air purifier and a ground surface 180 that is configured to allow air to flow under the air purifier 100. Additionally, the feet 176 may be manufactured from rubber such that they are configured to keep the air purifier 100 stationary on a surface that is not level. Alternatively, the feet 176 may be replaced with wheels or casters, so as to permit the air purifier 100 to roll along a surface. In addition to the structural features of the air purifier 100, FIG. 2 also shows the intended airflow path with arrows 188. The air purifier 100 is configured such that air flows into the air purifier 100 through the rear 116 air vents 136, through the air purifier 100, and out of the air vents 136 of the front housing 104. A more thorough discussion regarding the operation of the air purifier 100 is below.

Figure 3:
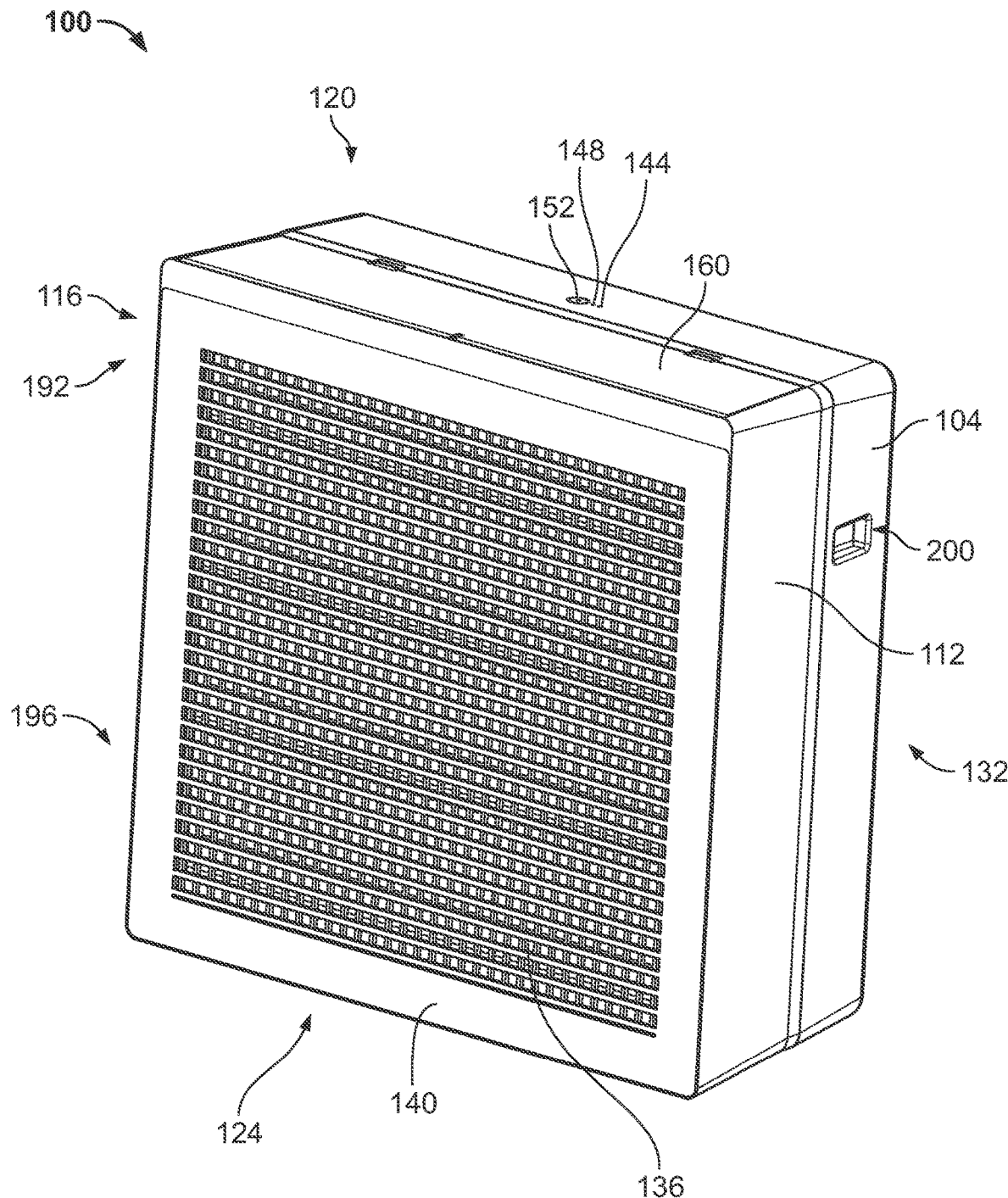
FIG. 3 is a rear, top, and left isometric view of the air purifier of FIG. 1.

Referring to FIG. 3, a top, left, and rear view of the air purifier 100 is shown. As mentioned above, the rear housing panel 140 has air vents 136 that allow air to enter the air purifier 100. Further, the rear housing panel 140 may be a separate component of the rear housing 112 as shown, or the rear housing panel 140 may be formed integrally with the rear housing 112. In an upper portion 192 opposite a lower portion 196 of the air purifier 100 along the right and left side 128, 132 of the front housing 104, the housing may include outwardly extending handles or inwardly extending notches, such as rectangular notches 200, that may be configured to allow for a user to lift and more easily move the air purifier 100.

Figure 4:
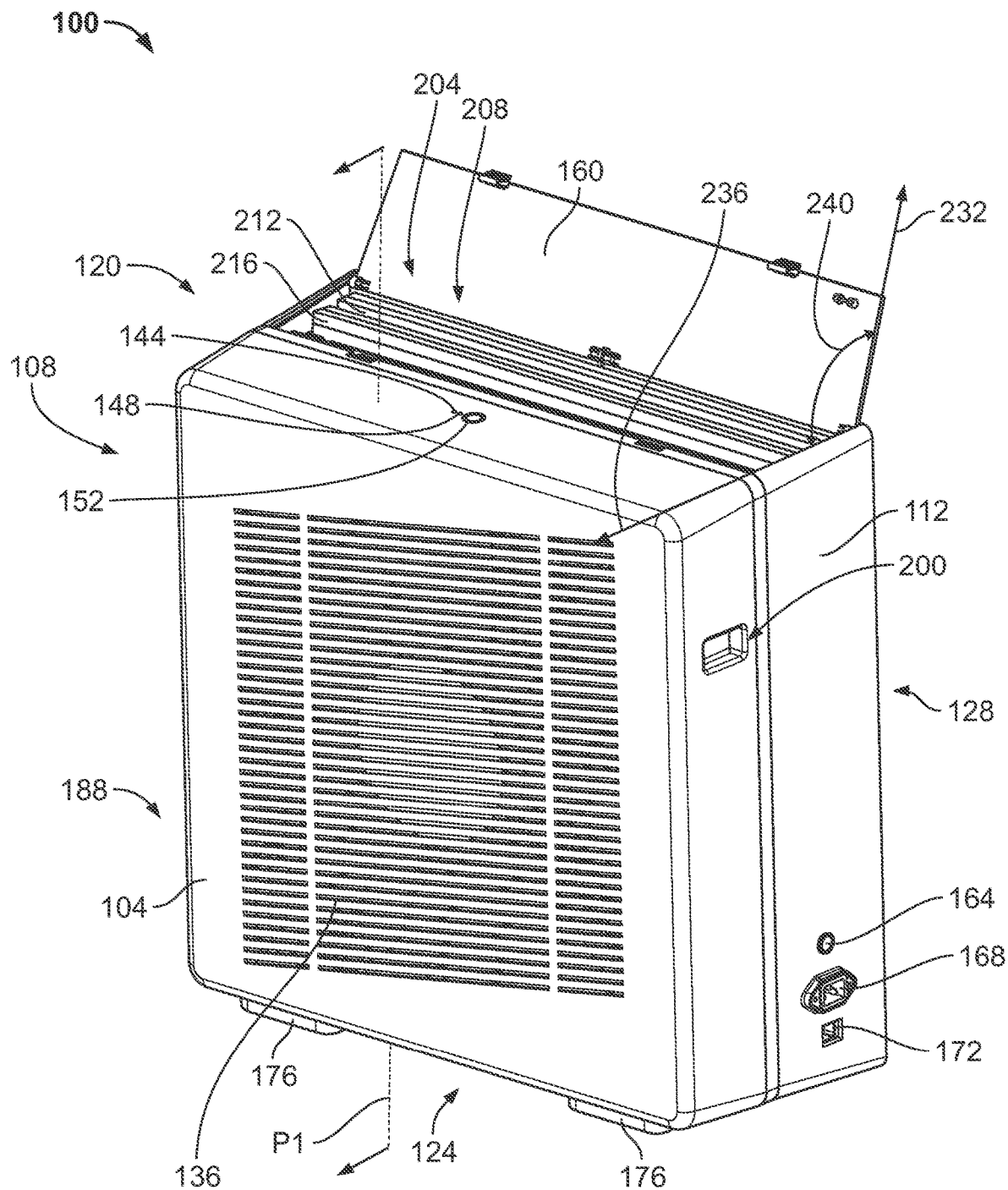
FIG. 4 is a front, top, and right isometric view of the air purifier of FIG. 1 shown in a lid open configuration.

Referring to FIG. 4, the air purifier 100 is shown with the lid 160 in an open configuration such that a user can access an air purifying compartment 204 that houses an air purifying assembly 208. The air purifying assembly 208 includes a first air filter 212 that is closest to the rear side 116 of the air purifier 100, a second air filter 216 that is mounted at an angle in front of the first air filter 212, a UV light 220 located between the first and second air filters 212, 216, and an odor absorber 224 and a fragrance diffuser 228 located in front of the second air filter 216, as seen in FIGS. 4-8. The air purifying compartment 204 and the air purifying assembly 208 are discussed in more detail below and shown best in FIGS. 5-9. Still referring to FIG. 4, the lid 160 defines a lid plane 232 and the top 120 of the air purifier 100 defines a top plane 236. The lid 160 is configured to open such that the lid plane 232 and the top plane 236 define a lid angle 240 that measures about 106 degrees when the lid 160 is in a fully open configuration. The lid 160 is configured to have a fully open lid angle 240 that is greater than 90 degrees such that the lid 160 stays open as the user replaces one or more of the air filters 212, 216 in the air purifying compartment 204. In some aspects, the lid angle 240 may be between about 90 degrees and about 180 degrees, or between about 90 degrees and about 135 degrees, or between about 90 degrees and about 115 degrees, or between about 90 and 95 degrees, or between about 95 and 100 degrees, or between about 100 and 105 degrees, or between about 105 and 110 degrees, or between about 110 and 115 degrees. In some aspects, the lid angle 240 may be greater than about 90 degrees, or about 95 degrees, or about 95 degrees, or about 100 degrees, or about 105 degrees, or about 110 degrees, or about 115 degrees. In some aspects, the lid angle 240 may be less than 90 degrees. Further, the lid 160 may configured such that the lid 160 activates a lid sensor (not shown) when the lid 160 is in closed configuration, i.e., a position where the lid plane 232 and the top plane 236 are parallel or where the cover of the lid 160 generally follows the contour of the top 120, such that the lid sensor (not shown) would be able to relay to the controller 156 (shown in FIGS. 5-8) that the lid 160 in a closed configuration and that it is acceptable to operate the air purifier 100. Conversely, the lid sensor (not shown) may relay to the controller 156 (shown in FIGS. 5-8) that the lid 160 is in an open configuration, e.g., the lid plane 232 and the top plane 236 define a lid angle 240 that is greater than zero degrees, and that the air purifier 100 should not operate. Similarly, the presence of the first and second air filters 212, 216, may also initiate filter sensors (not shown) that may relay to the controller 156 that the air purifier is ready to operate. In contrary, the absence of one or both air filters 212, 216 may result in the filter sensor (not shown) indicating to the controller 156 that the air purifier 100 should not operate.

Figure 5:
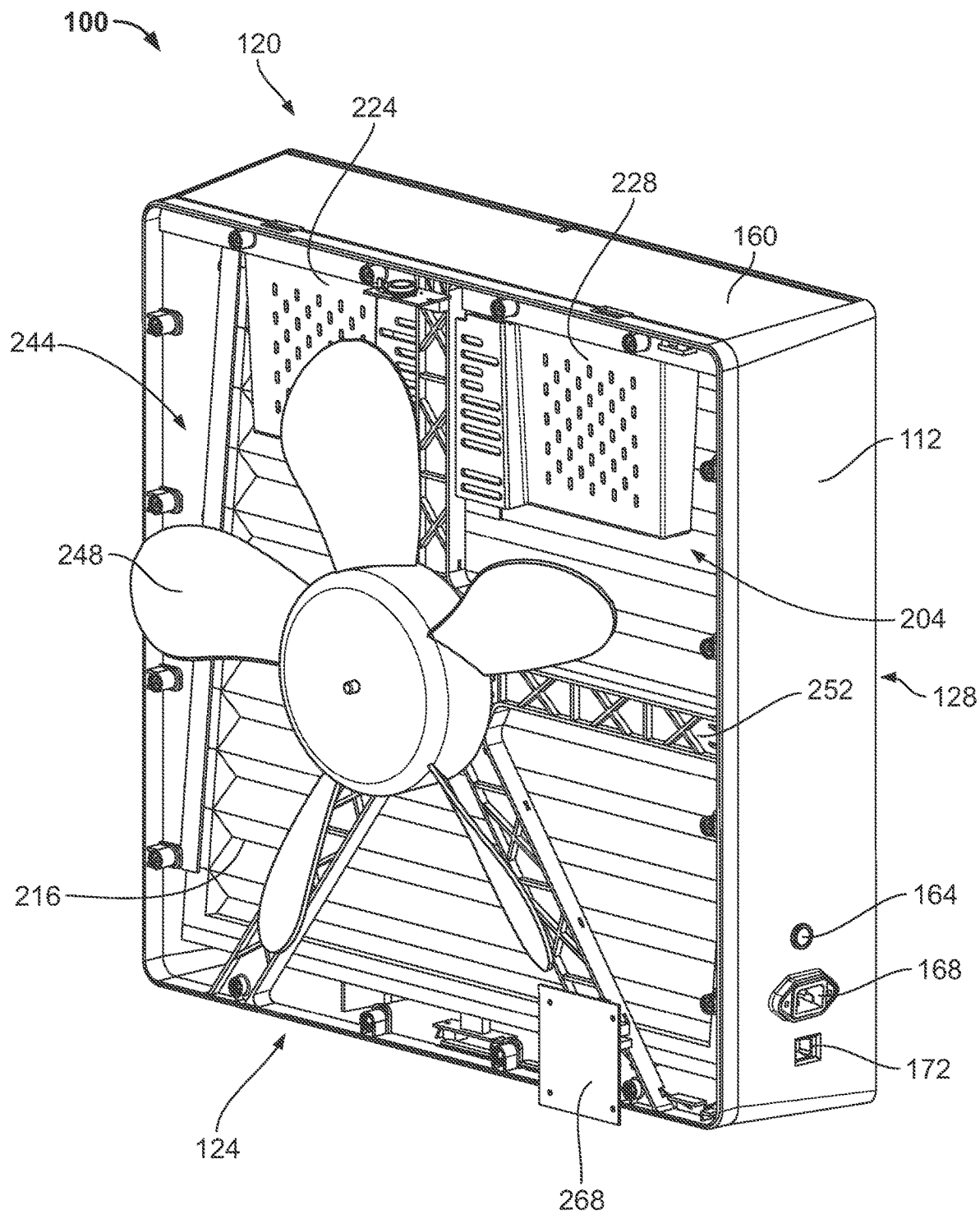
FIG. 5 is a front, top and right isometric view of the air purifier of FIG. 1 shown with a front cover and legs removed.

Referring to FIGS. 5-8, the air purifier 100 is shown with varying components of the air purifier 100 removed to better illustrate the internal components that comprise the air purifier 100. In FIG. 5, the front housing 104 and the two front feet 176 are removed such the air displacement mechanism or fan compartment 244 is visible. The fan compartment 244 is located along the front side 108 of the air purifier and is defined by the front housing 104 along the front side 108, the rear housing 112 along the top, bottom, right, and left sides 120, 124, 128, 132, and the second air filter 216 along the rear side 116. Within the fan compartment 244, there is a fan 248 or another type of air displacement device such as an air pump or a pneumatic pump. In some aspects, the air purifier 100 may use a diaphragm, a vacuum pump, or a compressor, or any other device configured to move air instead of the fan 248. Referring to FIG. 5, the fan 248 is mounted on a series of cross bars 252 that traverse between top, bottom, right, and left sides 120, 124, 128, 132, of the rear housing 112. In some aspects, the fan 248 may be configured to be adjustable within the fan compartment 244 such that the exit of the purified air into the surrounding environment can be modified by a user. For example, the fan 248 may be configured to be adjusted such that there is an increase or decrease of the exit angle of the air to influence the dispersion of the purified air into the surrounding environment. The fan 248 is connected to a motor 256 that is in electrical communication with the controller 156 which is in communication with the power supply 168. In some aspects, the motor 256 may be a brushless DC electric motor. In some aspects, the motor 256 may be a brushed DC electric motor.

Figure 6:
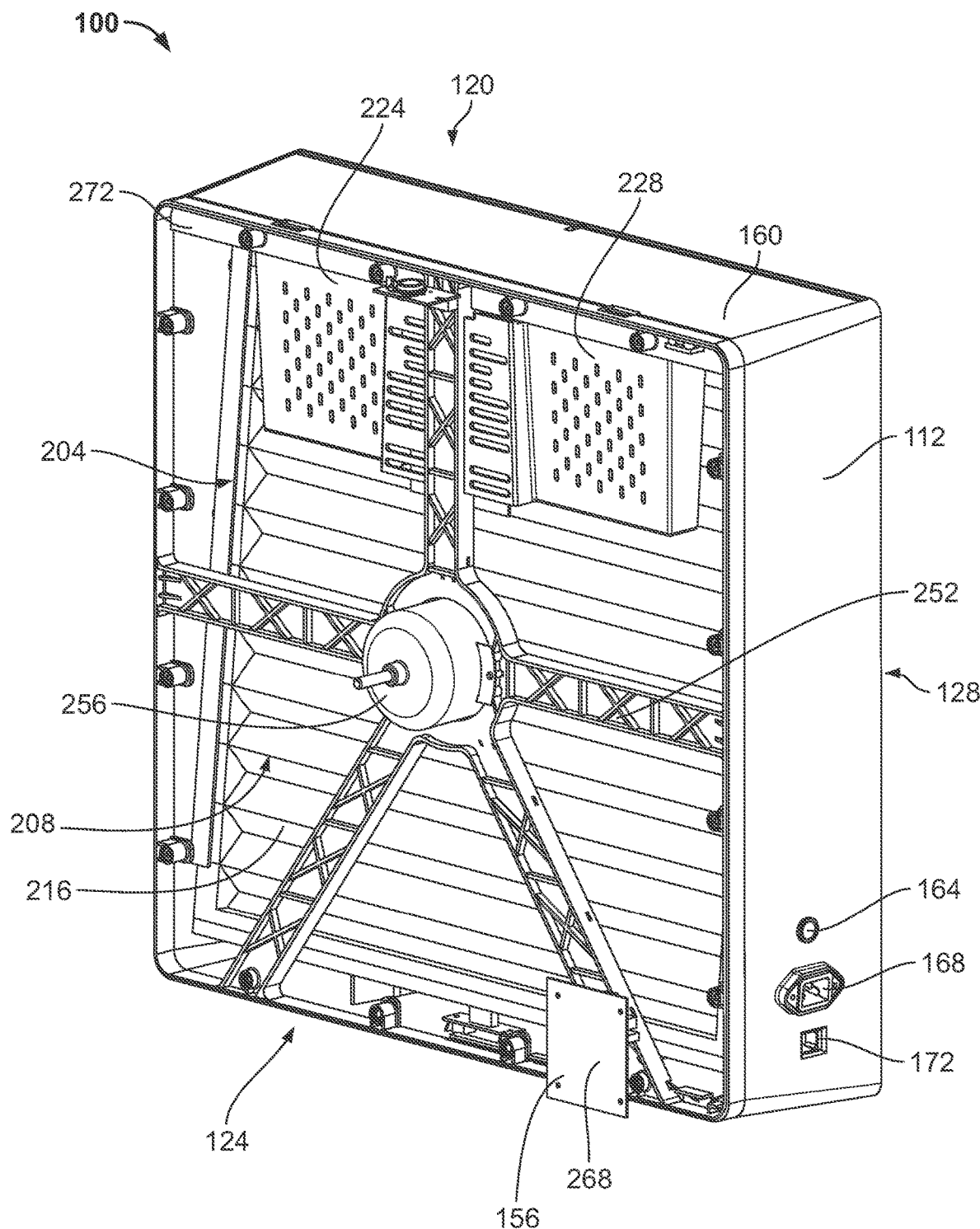
FIG. 6 is a front, top and right isometric view of the air purifier of FIG. 3 shown with a fan removed.
Figure 7:
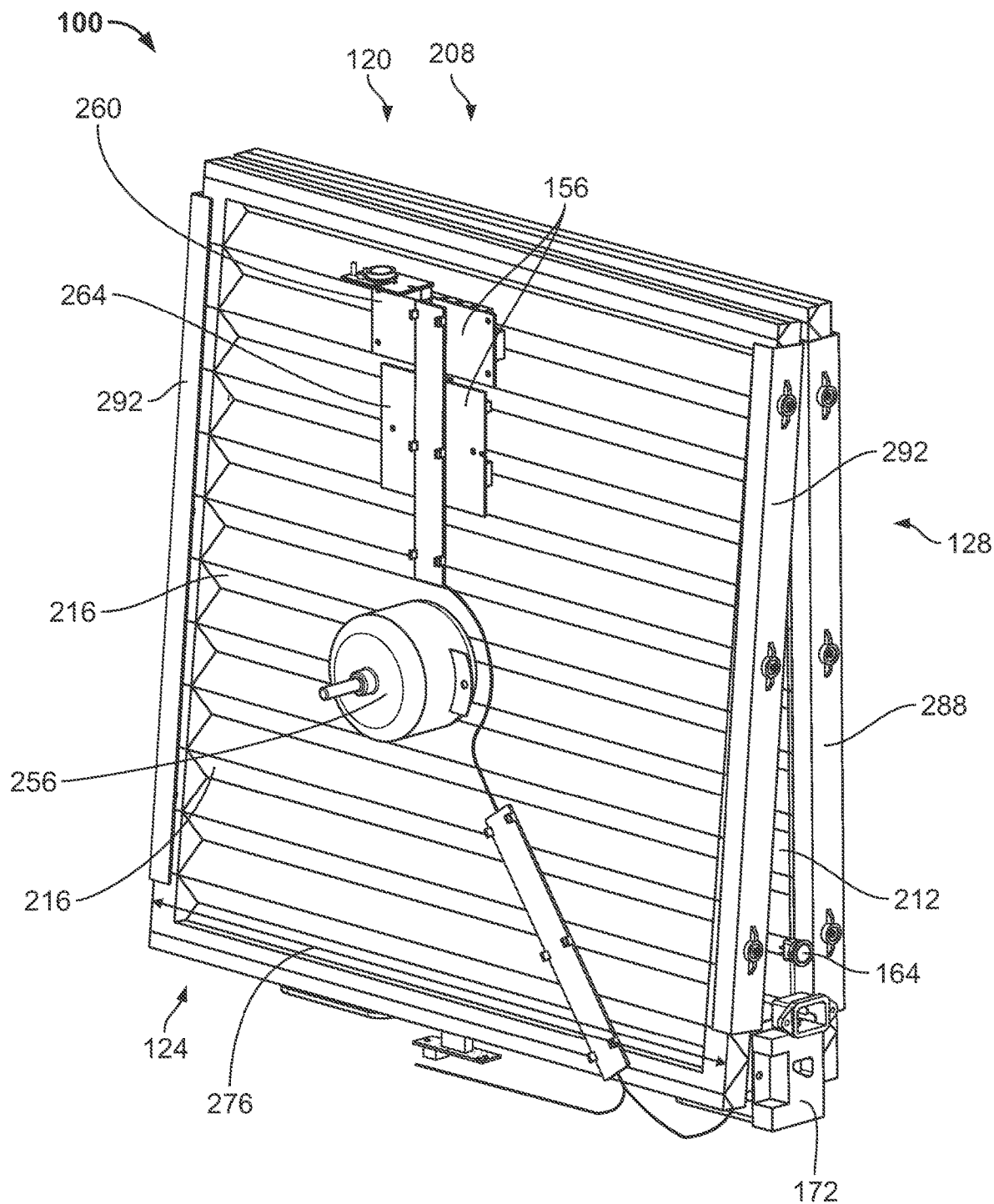
FIG. 7 is a front, top an right isometric view of the air purifier of FIG. 4 shown with the fan support structure and the power board removed.

Referring to FIGS. 5-7 the controller 156 is shown as a series of printed circuit boards ("PCB"). In the illustrated aspect, there is a main board 260, a fan board 264, and a power board 268 that are in communication and configured to work together to comprise the controller 156. In some aspects, there may only be one PCB that makes up the controller 156. In some aspects, there may be two, three, four, five or more PCBs that comprise the controller 156. In some aspects, the controller 156 may be located apart from the air purifier 100 such as on an offsite network server or on a smartphone. The controller 156 is used to control operation of the air purifier 100 and other electrical components such as the fan 248. The controller 156 may include a voltage regulator and may also include a number of other electrical components, including capacitors, resistors, inductors, fuses, diodes, and so forth. Additionally, the controller

156 may further include a first regulator and a second regulator, either of which may be a voltage regulator. In some aspects, the controller 156 may include a timer, which may allow the controller 156 to shut off specific electronic components after a predetermined amount of time of use for a predetermined amount of time or until receiving a user input to reactivate the components. The controller 156 may also include a plurality of other components disposed thereon, which may include a wireless communication device or receiver that may be a module that supports wireless communication. The wireless communication system may support Bluetooth® Low Energy (BLE) wireless communication, Wi-Fi, or other types of wireless communication. In one aspect, the wireless communication system includes one or more of onboard crystal oscillators, chip antenna, and/or passive components. The wireless communication system may support a number of peripheral functions, e.g., application deliver controller ("ADC"), timers, counters, pulse width modulation ("PWM"), and serial communication protocols. Some of the serial communication protocols used through the wireless communication system's programmable architecture may include I2C, universal asynchronous receiver/transmitter ("UART"), and serial peripheral interface ("SPI"). The controller 156 may be or include a microcontroller unit ("MCU") and/or an application-specific integrated circuit ("ASIC"). Additionally, the controller 156 may include a processor, a flash memory, and additional components not specifically noted herein. The controller 156 may utilize one or more auxiliary inputs, such as the setting button 152 or various sensors including the dust sensor 172, that are configured to provide information such as user preferences, button selection, and environmental factors.

Referring to FIGS. 5 and 6, behind the fan compartment 244 in the air purifying compartment 204, the fragrance diffuser 228 and the odor absorber 224 are mounted to a support beam 272 that is attached to the top 120 of the rear housing 112. The fragrance diffuser 228 may be configured to output various fragrances into the filtered air. Further, the fragrance diffuser 228 may be configured to receive a fragrance refill (not shown) that may be a pre-dosed pad or gel. In some aspects, the fragrance refill may be integral and nonremovable from the fragrance diffuser 228. In some aspects, the fragrance refill may be a refillable container that may include a cartridge. In some aspects, the fragrance diffuser 228 is configured to hold a volatile material that may include one or more compositions, which may be any suitable liquid or liquids, and may include one or more active ingredients. Some active ingredients include, but are not limited to, one or more of a fragrance comprised of one or more aroma chemicals, an aromatherapy scent, a positive fragrancing active material, an air-freshener, or the like, and combinations thereof. In addition to the fragrance diffuser 228, the odor absorber 224 is also within the air purifying compartment 204. The odor absorber 224 may hold household baking soda, an activated carbon, a liquid that bonds with and neutralizes unwanted odors in the air, and/or a jelly-like substance that absorbs unwanted odor molecules from the air. In some aspects, the odor absorber 224 may be configured to receive a refill in any of the forms described in conjunction with the fragrance diffuser 228.

Figure 8:
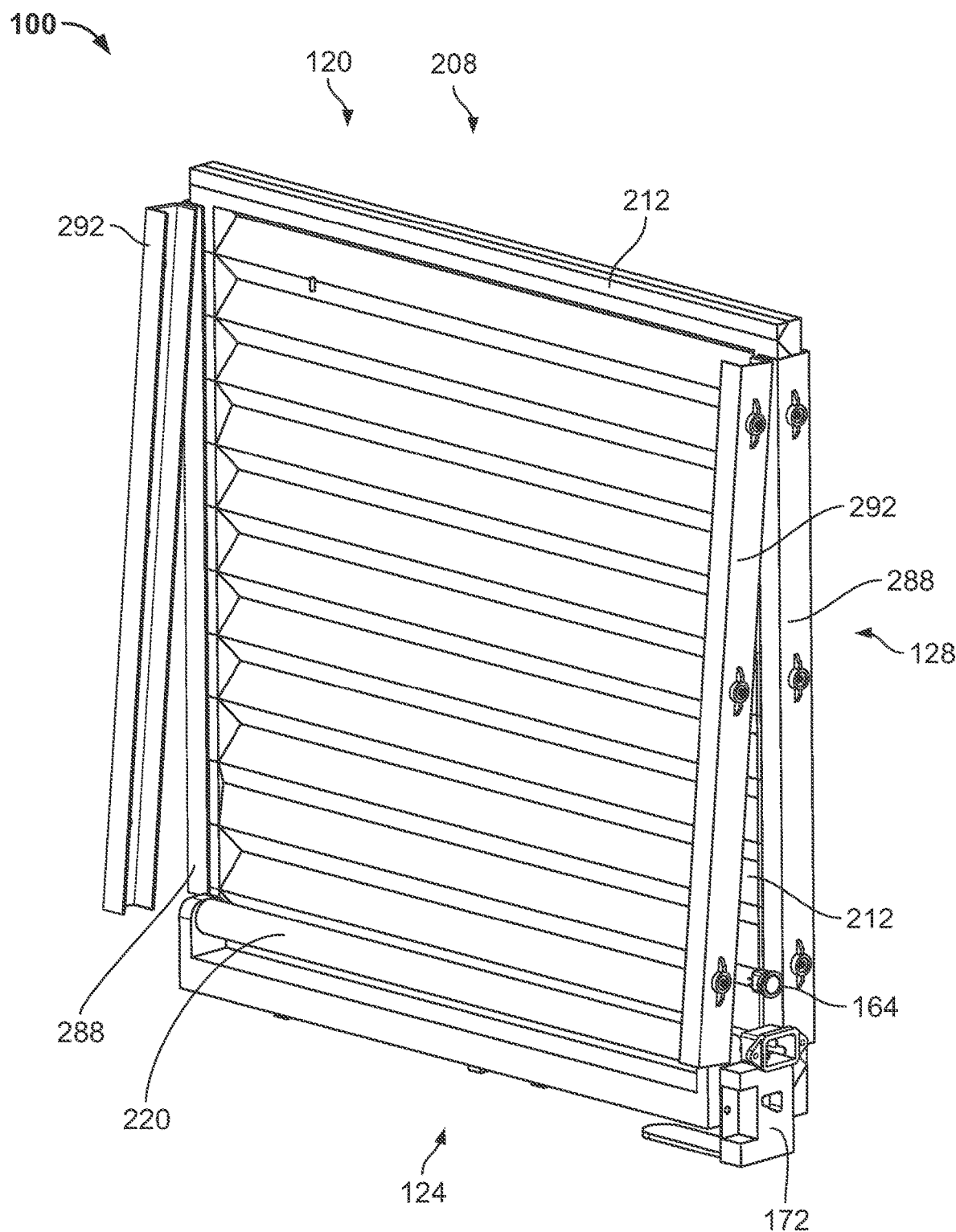
FIG. 8 is a front, top and right isometric view of the air purifier of FIG. 5 shown with the second filter removed.

Referring to FIGS. 7 and 8, the air purifier 100 is shown without the front and rear housings 104, 112, the feet 176, and the fan 248 such that the air purifying compartment 204 can be seen with fewer disruptions. The air purifying compartment 204 is a rectangular section of the air purifier that houses the air purifying assembly 208, i.e., the first and second air filters 212, 216, the UV light 220, the fragrance diffuser 228, and the odor absorber 224. The air purifying compartment 204 is defined between the series of cross bars 252 that traverse between top, bottom, right, and left sides 120, 124, 128, 132 of the rear housing 112 that the fan 248 is mounted on (see FIG. 9), the rear housing 112, and the rear housing panel 140. Within the air purifying compartment 204, the first and the second air filters 212, 216 are positioned on opposite sides of a UV light 220, and the odor absorber 224 and fragrance diffuser 228 are located in front of the second air filter 216.

Figure 9:
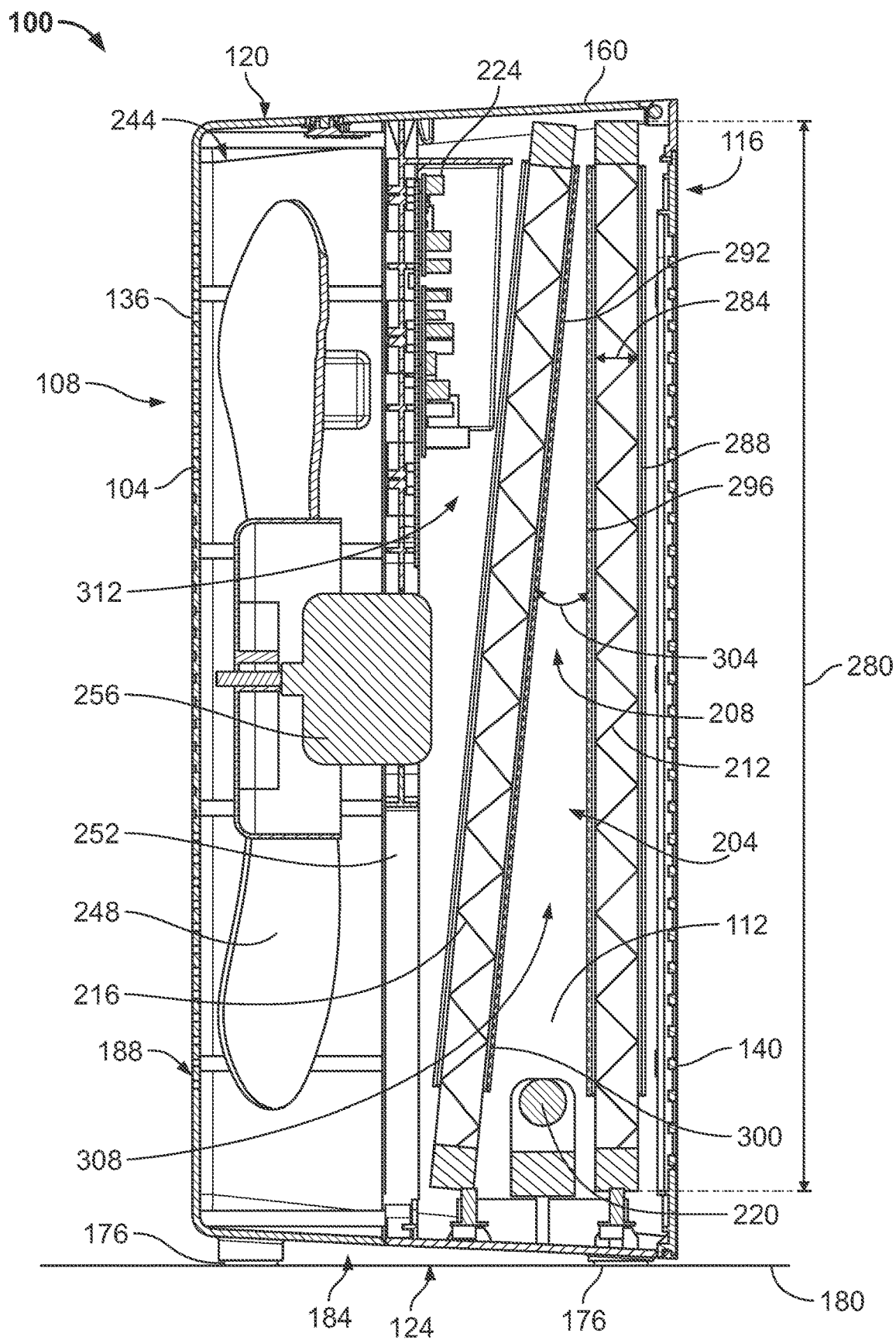
FIG. 9 is a right side cross-sectional view along plane P1 of the air purifier of FIG. 1.

Referring to FIGS. 7-9, the first air filter 212 or the rear filter is positioned such that it will be the first component of the air purifying assembly 208 that the air passes though during normal operation of the air purifier 100. The first air filter 212 may be an activated carbon filter that is configured to provide odor absorption and gas-eliminating filtration by trapping molecules such as volatile organic compounds ("VOC") on the outside surface thereof. In some aspects, the first air filter 212 may not be a carbon filter, or the first air filter 212 may be another type of odor absorbing filter that does not include carbon. The second air filter 216 may be a high-efficiency particulate air filter ("HEPA filter") that is designed to trap 99.97 percent of particles that are 0.3 microns such as allergens. In some aspects, the second air filter 216 is any filter that is configured to remove dust pollen, mold, bacteria, and a variety of other airborne particles. In some aspects, both the first and the second air filters 212, 216 have the same filter width 276, the same filter height 280, and the same filter depth 284. Further the filter widths 276, heights 280, and depths 284 for both the first and the second air filters 212, 216 may correspond to standard filters sizes such as 8 inches by 15 inches by 1 inch, 19 inches by 22 inches by 1 inch, 20 inches by 20 inches by 1 inch, or by any other commercially available filter size.

Referring to FIGS. 7-9, the UV light 220 is located on the lower portion 196 of the air purifier 100 between the first and the second air filters 212, 216. The UV light 220 may be a UV germicidal lamp that is a TUV T8 lamp that is a double-ended UVC (germicidal) lamp. In some aspects, the UV light may be a light that emits almost constant UV output over the complete lifetime of the light such that the air purifier 100 can achieve a maximum certainty of disinfection and high system efficacy while at the same time allowing for predictable planned maintenance of the air purifier 100 and the UV light 220. Further, the UV light 220 may be any type of light configured for the killing of airborne living bacteria that passes through the air purifier.

Referring to FIG. 9, a left side cross-sectional view of the air purifier 100 is shown. The first air filter 212 is restrained within the air purifier 100 with a first set of filter holders 288. The first set of filter holders 288 are mounted such that they are generally parallel with the rear housing panel 140 and perpendicular to the ground surface 180 when the air purifier 100 is in an upright position. The second set of filter holders 292 are mounted such that they are angled when compared to the first set of filter holders 288. As shown, the first set of filter holders 288 define a first filter holder axis 296 that is generally parallel, and the set second filter holders 292 define a second filter holder axis 300 that is offset from the first filter holder axis 296. The first and second filter holder axes 296, 300 define a filter angle 304. The filter angle 304 may be between about 1 and about 40 degrees, or about 5 and about 25 degrees, or about 5 and about 15 degrees, or about 10 degrees. In some embodiments, the filter angle 304 may be between about 1 and about 3 degrees, or about 3 and about 6 degrees, or about 6 and about 8 degrees, or about 8 and about 10 degrees, or about 10 and about 15 degrees, or about 15 and about 20 degrees, or about 20 and about 25 degrees, or about 25 and about 30 degrees, or about 30 and about 35 degrees, or about 35 and about 40 degrees.

Still referring to FIG. 9 the UV light 220 is mounted at the bottom 124 of the air purifying compartment 204 towards the rear side 116, and the odor absorber 224 which has a similar lateral position as the fragrance diffuser 228 is mounted from the top 120 towards the front 108 of the air purifying compartment 204. As shown, the second air filter 216 is mounted such that it is configured to extend from the bottom 124 front side 108 of the air purifying compartment 204 to the top 120 rear 116 of the air purifying compartment 204. As a result, the bottom 124 of the rear housing 112 along with the first and the second air filters 212, 216 define a first generally triangular cross-sectional profile 308. In this aspect, the first profile 308 resembles a right triangle. The second air filter 212 the top 120 of the rear housing 112, and the series of cross bars 252 define a second generally triangular profile 312. By the second air filter 216 being mounted such that it extends from the front and bottom 108, 124 to the top and rear side 120, 116 of the air purifying compartment 204, the air purifier 100 is able to include both air filters 212, 216, the UV light 220, the fragrance diffuser 228, and the odor absorber 224 in air purifying compartment 204 that is smaller than if the second air filter 216 was mounted vertically like the first air filter 212. By having a smaller air purifying compartment 204 when compared to an air purifier with both air filters mounted in vertically and parallel to each other, the air purifier 100 is smaller, making it easier to store and transport, while also permitting it to be made with less material, decreasing the cost and environmental impact.

Referring to FIGS. 1-9, the air purifier 100 may be configured to make deviations in the power supply 168 sent from the controller 156 to the fan 248 to manipulate the air purification rate and noise level of the air purifier 100 that may be perceptible by a user. In some aspects of the present disclosure the controller 156 may use auxiliary inputs that may include discrete user inputs using the setting button 152 on the air purifier 100 that provide for different air quality levels that are perceptible by a user, e.g., "low," "medium," and "high." For example, 4.0 Watts (W) of power output to the fan 248 may be associated with a "low" setting, 5.0 W of power outputted to the fan 248 may be associated with a "medium" setting, and 6.0 W of power outputted to the fan 248 may be associated with a "high" setting.

In some aspects, the air purifier 100 may use duty cycles to achieve a desired air quality level in the surrounding environment. For example, the power switch 164 of the air purifier 100 that is used to power "on" and "off" the air purifier may be activated to an "on" position. After, the controller 156 may direct electric current to flow to the fan 248 using power supplied by the power supply 168. Once a target air quality is achieved, the controller 156 may shut off the electrical current supplied to the fan 248 while continuously monitoring air quality level of the surrounding environment using the dust sensor 172 or another environmental sensor. When the measured air quality level is at or below a predetermined value, the controller 156 may be configured to restore electrical current to the fan 248 initiate another operation cycle.

Still referring to FIGS. 1-9, the controller 156 may be configured to receive information from one or more of the auxiliary inputs which may include additional environmental sensors (not shown) and additional user inputs using the buttons 148, 152 and switches (not shown) or an app on a smartphone. In some aspects, the environmental sensors may include, but are not limited to, a dust sensor, a microphone, a camera, a turbidity sensor, a thermometer, a humidity sensor, a passive infrared sensor, a light sensor, a lightning sensor, a wind transducer, a compass, a Global Positioning System ("GPS"), a gyroscope, an accelerometer, a barometer, a crash sensor, a proximity sensor, a radar, an ultrasonic sensor, or any combination thereof.

In some aspects, the auxiliary inputs may include user inputs which may be input into the air purifier 100 via the setting button 152. In some aspects, the setting button 152 may be configured to control a desired air quality level using operational cycles while monitoring the air quality levels using the dust sensor 172, alone or in combination with any of the other environmental sensors listed above. The setting button may be pressed one time to define a "low" setting, which may set the air purifier 100 to operate with 25 minutes between each operational cycle of the fan 248. The setting button 152 may be pressed two time such that a second setting may be active that defines a "medium" setting that may set the air purifier 100 to operate with 15 minutes between each operational cycle of the fan. The setting button may be pressed three times such that a third setting is activated that defines a "high" setting that may set the air purifier 100 to operate with 5 minutes between each operational cycle of the fan. By altering the settings using the setting button 152, a user can alter the timing between operational cycles so that different amounts of purified air can be produced, so as to affect the air quality in the surrounding environment. In some aspects, the setting button may additionally or alternatively be provided via a display screen of an electronic device that is in communication with one or more of the electrical components within the air purifier 100. For example, the setting button may be on a smartphone app.

In some aspects, the air purifier 100 may include features that provide enhanced customization and adaptation capabilities. Algorithms may be used by the air purifier 100 to modify the operational parameters according to user preferences and/or air quality requirements. Generally, the controller 156 operates the air purifier 100 according to pre-programmed sequences, which are designed to control the air quality level of the surrounding environment measured by one or more environmental sensors such as the dust sensor 172. More specifically, algorithms may be used to vary the duration and intensity of the power applied to the fan 248 (e.g., controlling the speed or revolutions per minute (RPM) of the fan 248).

In some aspects, the power limits may vary for different environments. Further, the operational cycles (e.g., on time/off time between activations) may also be different among different environments. In some aspects, both operational cycles and intensity limits may be changed throughout operation of the air purifier 100 due to changes that may occur over time and/or due to one or more of a number of external factors that may be measured or identified either automatically or from information input by a user. In some aspects, automatic triggers may cause the operational cycles and intensity limits to be adjusted, for example, based on a time of the day, a measured room temperature, a season of the year, or inputs from a user acquired from the electronic device (e.g., a cell phone, a smart watch, or another type of device having sensors or that can receive user inputs). The inputs may be received from environmental sensors or a user, which may include external sensors along any number of devices that are configured to communicate either directly with the air purifier 100, or with an electronic device, and that are configured to provide feedback to the air purifier 100. The changes in operational cycles and intensity levels can also be triggered via requests from an app or via direct physical interaction with the air purifier 100.

The air purifier 100 of FIGS. 1-9 may be configured to use the dust sensor 172 to monitor the air quality in the surrounding environment. The air purifier 100 may be configured to run an initial run cycle upon being turned on by a user. The initial run cycle may be configured to run the air purifier 100 until the dust sensor 172 measures a predetermined air quality or dust threshold in the surrounding environment. After the predetermined air quality or dust threshold is measured, the air purifier 100 may then fall into a secondary cycle (i.e., a sustaining cycle, after an initial filling cycle). The secondary cycle may include the air purifier 100 running on high for 25 minutes every 30 minutes, running on high for 15 minutes every 30 minutes, running on high for 10 minutes every 30 minutes, or running at some other speed and/or duration.

In some aspects, the air purifier 100 may additionally or alternatively have a secondary cycle that corresponds with a ratio of time running on high to rest time. For example, the air purifier 100 may have a "low" setting where the air purifier 100 runs for about 100 units of time followed by a rest period of between about 150 and about 250 units of time, a "medium" setting where the air purifier 100 runs on high for about 100 units of time followed by a rest period of between about 75 and about 150 units of time, and a "high" setting where the air purifier 100 runs for about 100 units of time followed by a rest period of between about 25 and about 75 units of time. In some aspects, the secondary cycle may include the air purifier 100 being in a rest period until being activated by a mobile phone using an app. In some aspects, a unit of time may be a millisecond, a second, a minute, an hour, a day, or any other unit of time.

Still referring to FIGS. 1-9, the air purifier 100 may be configured to run an initial run cycle upon being turned on by a user. The initial run cycle may include the air purifier 100 running until the dust sensor 172 measures a predetermined air quality or dust threshold in the surrounding environment. After the predetermined air quality or dust threshold is measured, the air purifier 100 may be configured to only run after the dust sensor 172 measures a predetermined air quality or dust threshold above a predetermined or user-input threshold.

Figure 10:
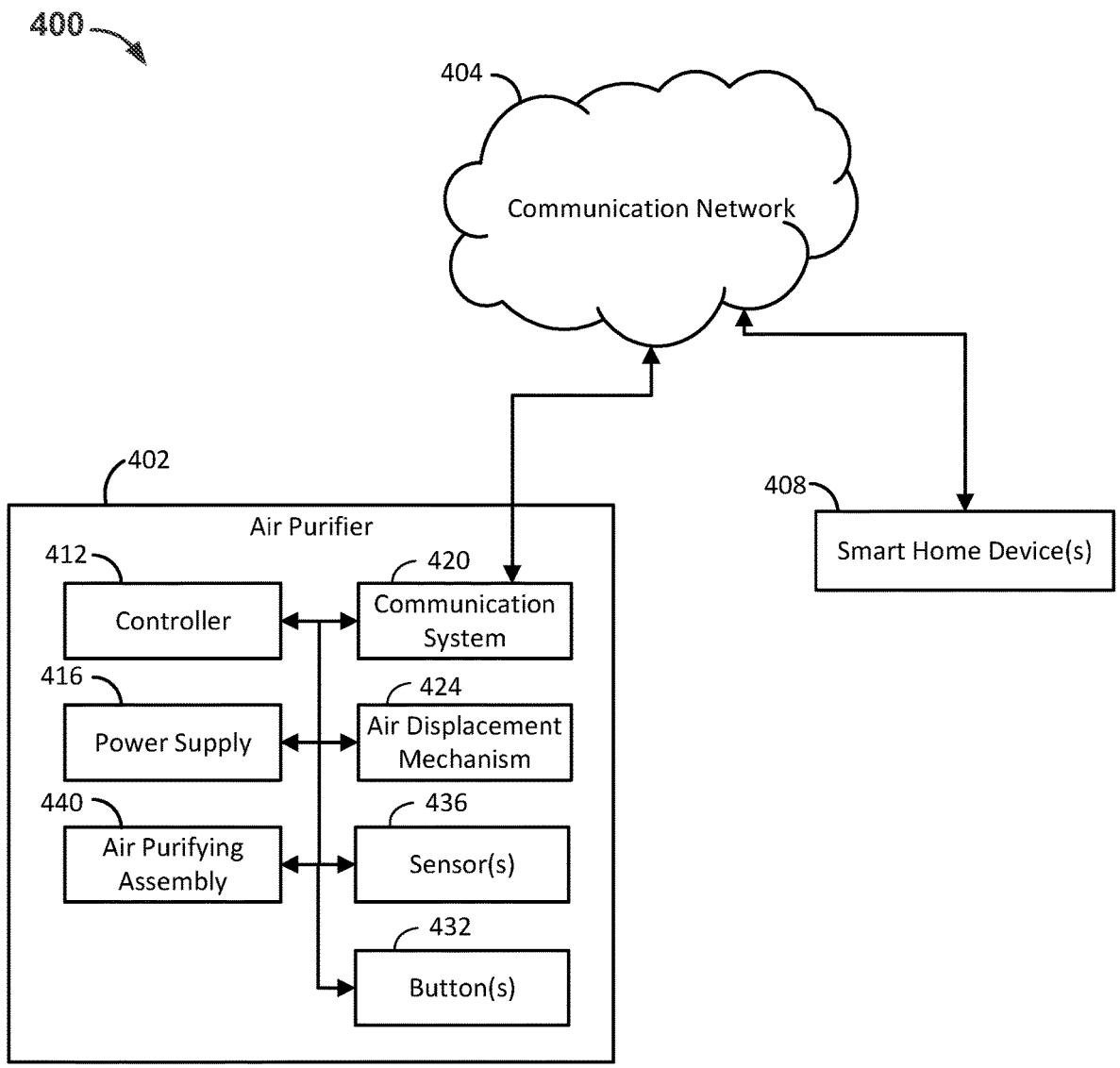
FIG. 10 is a schematic of another air purifier that is connected to a communication network and one or more smart home devices.

Now referring to FIG. 10, an air purification system 400 is shown that comprises an air purifier 402 a communication network 404, and one or more smart home devices 408. The communication network 404 is in communication with one or more smart home devices 408 and the air purifier 402. The air purifier 402 comprises a controller 412, a power supply 416, a communication system 420, an air displacement mechanism or a fan 424, one or more buttons 432 such as a setting button, and one or more sensors 436. It will be appreciated that the air purifier 402 of FIG. 10 includes components that are similar (i.e., structurally and/or functionally similar) with respect to components of the air purifier 100 of FIGS. 1-9. For example, the controller 412 of FIG. 10 may be similar to the controller 156 of FIG. 1-9. Additionally, the air displacement mechanism or fan 424 may be similar to the air displacement mechanism or fan 248 of FIG. 1-9. The power supply 416 and the air purifying assembly 440 and their structural layout may be similar to the power supply 168 and the air purifying assembly 208 and their structural layout of FIG. 1-9.

Still referring to FIG. 10, the one or more smart home devices 408 that are in communication with the communication network 404 may include but are not limited to a Google® Nest® Thermostat, a home security system, an Amazon® Alexa®, a Ring® Video Doorbell, a motion detector, a garage door opener, a gate access opener, a neighborhood guardhouse, a smart T.V., a thermostat, an automatic lock, an HVAC unit, and/or any other smart home device. In some aspects, the smart home devices 408 may include a wireless communication device such as a mobile phone with a graphical user interface (GUI), or any other device, such as, e.g., a laptop, a tablet, a desktop, a server, or a special purpose computer.

The communication network 404 can be any suitable communication network or combination of communication networks. For example, the communication network 404 may include a Wi-Fi network (which can include one or more wireless routers, one or more switches, etc.), a peer-to-peer network (e.g., a Bluetooth® network), a cellular network (e.g., a 3G network, a 4G network, a 5G network, etc., complying with any suitable standard, such as CDMA, GSM, LTE, LTE Advanced, NR, etc.), a wired network, etc. In some aspects, the communication network 404 can be a local area network (LAN), a wide area network (WAN), a public network (e.g., the internet), a private or semi-private network (e.g., a corporate or university intranet), any other suitable type of network, or any suitable combination of networks.

Communications links shown in FIG. 10 can each be any suitable communications link or combination of communications links, such as wired links, fiber optic links, Wi-Fi links, Bluetooth® links, cellular links, etc. In a preferred aspect, the communication network 404 is a Bluetooth® network that is compatible with all the components of the air purifier 402. The communications network systems (not shown) that are used to comprise the communication network 404 can include any suitable hardware, firmware, and/or software for communicating information over the communication network 404 and/or any other suitable communication networks. For example, the communication network systems (not shown) can include one or more transceivers, one or more communication chips and/or chip sets, etc. In a more particular example, the communication network systems (not shown) include hardware, firmware and/or software that can be used to establish a Wi-Fi connection, a Bluetooth® connection, a cellular connection, an Ethernet connection, etc.

The communication system 420 in the air purifier 402 can be any communication device such as a special purpose computer. The communication system 420 may support Bluetooth® Low Energy (BLE) wireless communication, Wi-Fi, or other types of wireless communication. In a preferred aspect, the communication system 420 may include one or more of onboard crystal oscillators, chip antenna, and/or passive components. The communication system 420 may support a number of peripheral functions such as ADC, timers, counters, PWM, and serial communication protocols, (e.g., I2C, UART, SPI), through its programmable architecture. The communication system 420 may be an electronic device that includes a processor, a flash memory, a timer, and additional components typical of such electronic devices. The communication system 420 may be used to collect and transmit information through the communication network 404 to be delivered to the controller 412. For example, the information can include user preferences, switch selection, and environmental factors and measurements. In some aspects, the communication system 420 collects data associated with environmental factors and measurements using environmental sensors via the sensor(s)

436. The environmental sensors may include any of the sensors discussed above such as a dust sensor.

Referring to FIG. 10, the communication system 420 may send the user inputs and auxiliary inputs from the button(s) 432 and the sensor(s) 436 to the communication network 404 to be relayed to the smart home devices 408. In some aspects, the smart home devices 408 may send the user inputs and the auxiliary inputs to the communication network 404 to be sent to the communication system 420 and the controller 412 of the air purifier 402. In some aspects, the user may directly input data corresponding to the auxiliary inputs via a graphical user interface (GUI) provided on a display (not shown) and aided by memory (not shown) as part of one of the smart home devices 408. In some aspects, the display (not shown) includes any suitable display devices, such as a computer monitor, a touchscreen, a television, a projector, etc. In some aspects, any suitable input devices and/or sensors can be used to generate the user inputs for the auxiliary inputs, such as a keyboard, a mouse, a touchscreen, a microphone, etc.

In some aspects, the user may input information that describes the current geographic location of the device and/or the current atmospheric conditions into the smart home device 408 (e.g., a mobile phone). The inputted information from the user could then be sent to the controller 412 to be used to determine the optimal operational cycles, or the smart home device 408 may use the information to determine the optimal operational cycles and send the optimal operational cycles to the controller 412. The optimal operational cycle for the air purifier 402 may be based on a variety of factors including data from the sensor(s) 436, button(s) 432, smart home device(s) 408, and user inputs. For example, the optimal operational cycle may correspond to a user's input of wanting a high air quality level in conjunction with data form one of more of the senor(s) indicating that there is currently a low air quality level such that the controller creates an operational cycle that has the air purifier 402 operating at a high intensity for a long period of time. In contrary, the optimal operational cycle for the air purifier 402 may be the air purifier 402 operating for a short period of time at a low intensity level if the air quality is high and the user generally desires maintenance of the air quality level.

Still referring to FIG. 10, the air purifier 402 may receive information on the HVAC operating cycle through one or more of the smart home devices 408. In some aspects, the air purifier 402 can shut itself off while the HVAC system is operating. After the HVAC system is done with its cycle of being on, the air purifier 402 may be configured to run an initial cycle to achieve a predetermined air quality threshold within the surrounding environment before proceeding to a secondary cycle where the air quality threshold is maintained. In another aspect, the air purifier 402 may be configured to turn on while the HVAC system is operating.

In some aspects, devices or systems disclosed herein can be used, manufactured, or installed using methods embodying aspects of the disclosure. Correspondingly, any description herein of particular features, capabilities, or intended uses of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated, discussion herein of any method of manufacturing or use for a particular device or system, including installing the device or system, is intended to inherently include disclosure, as aspects of the disclosure, of the utilized features and configurations, and implemented capabilities of such device or system.

Figure 11:
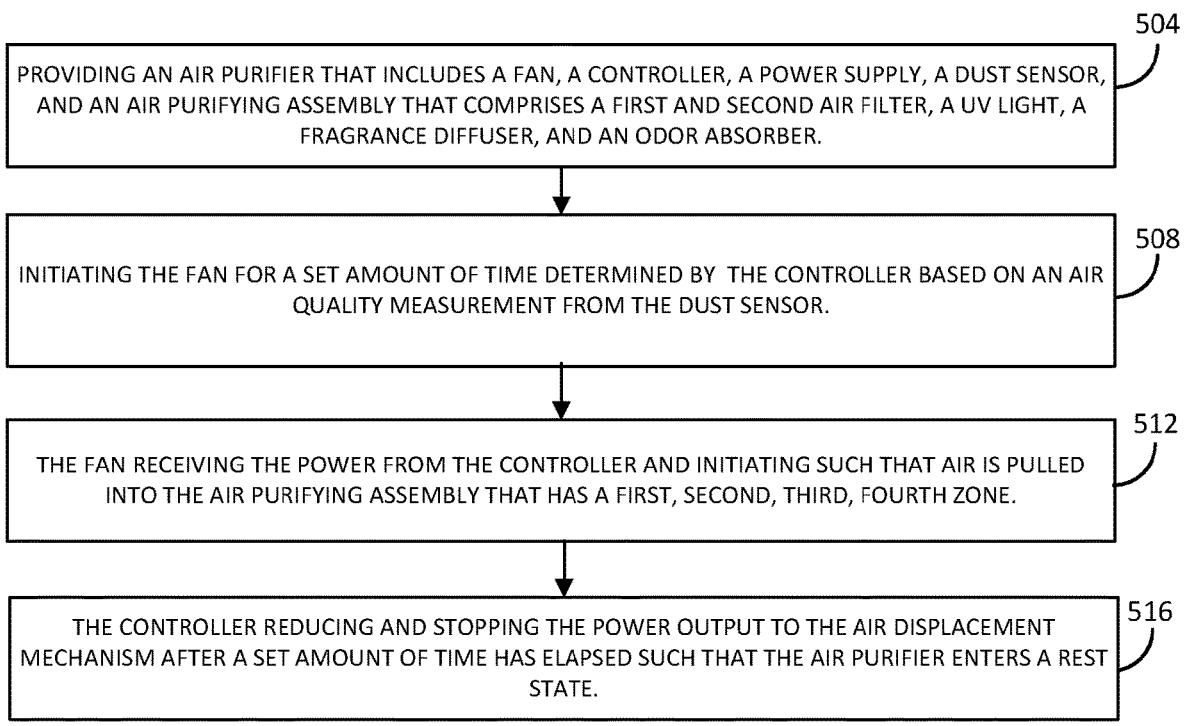
FIG. 11 is a schematic of a method of operating an air purifier.

Referring now to FIG. 11, a method 500, which may include more or fewer steps than depicted, is shown for purifying air using an air purifier such as the air purifier 100 in FIGS. 1-9 or the air purifier 402 in FIG. 10. At a first step 504, the method 500 includes providing an air purifier that includes a fan, a controller, a power supply, a dust sensor, and an air purifying assembly that comprises a first and second air filter, a UV light, a fragrance diffuser, and an odor absorber. In some aspects, the first and second air filter may be mounted at an angle from each other within an air purifying compartment in a way that is similar to the air purifier 100 in FIG. 1-9. At a second step 508, the method 500 includes initiating the fan for a set amount of time determined by the controller based on an air quality measurement from the dust sensor. In some aspects, the controller may determine the set amount of time based auxiliary inputs beyond the dust sensor. At a third step 512, the method 500 includes the fan receiving power from the controller and initiating such that air is pulled into the air purifying assembly that has first, second, third, and fourth zones. In some aspects, the first zone may correspond with the first air filter that may be an activated carbon filter that is configured to provide odor absorption and gas-elimination filtration, the second zone may correspond to an area where the air passes through UV rays emitted by the UV light that is configured to kill small airborne living bacteria, the third zone may correspond to the second air filter that may be a HEPA filter, and the fourth zone may correspond to where the air passes either an air fragrance diffuser and/or an odor absorber. At a fourth step 516, the method 500 includes the controller reducing and stopping the power output to the air displacement mechanism after a set amount of time has elapsed such that the air purifier enters a rest state. In some aspects, the rest state may be a state in which the air purifier is not operating the fan, but is monitoring the air quality using the dust sensor.

It will be appreciated by those skilled in the art that while the invention has been described above in connection with particular aspects and examples, the invention is not necessarily so limited, and that numerous other aspects, examples, uses, modifications and departures from the aspects, examples and uses are intended to be encompassed by the claims attached hereto.

Any of the aspects described herein may be modified to include any of the structures or methodologies disclosed in connection with different aspects. Further, the present disclosure is not limited to the air purifier of the type specifically shown. Still further, the methods and systems of any of the aspects disclosed herein may be modified to work with any type of air purifier.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the disclosure. The exclusive rights to all modifications which come within the scope of the appended claims are reserved.

We claim:

1. An air purifier comprising:
   a front and a rear housing that are connected;
   a power supply that is in communication with a controller;
   a fan that is in communication with the power supply and is located within a fan compartment within the front housing; and
   an air purifying assembly that is within the rear housing in an air purifying compartment and includes a first air filter, a second air filter, a UV light, an odor absorber, and a fragrance diffuser,
   wherein the first air filter is restrained vertically within the rear housing using a first set of filter holders that define a first filter holder axis and are attached to a right side and a left side of the rear housing,
   wherein the second air filter is restrained at an offset angle to the first air filter within the rear housing using a second set of filter holders that define a second filter holder axis and are attached to the right side and the left side of the rear housing, and
   wherein the first and the second filter axes define a filter angle that is nonzero.

2. The air purifier of claim 1, wherein the air purifying compartment has a rectangular cross-section when split across a plane that extends through the front and rear housings of the air purifier.

3. The air purifier of claim 2, wherein the air purifying rectangular cross-section comprises a first triangular cross-section and a second triangular cross-section,
   wherein the first triangular cross-section is defined by a bottom of the rear housing and the first and second air filters, and
   wherein the second triangular cross-section is defined by a top of the rear housing, the second air filter, and a series of cross bars that the fan is mounted to that extend from the top, the bottom, and the right and the left side of the rear housing.

4. The air purifier of claim 1, wherein the filter angle is between about 5 and 15 degrees.

5. The air purifier of claim 4, wherein the filter angle is between about 8 and 10 degrees.

6. The air purifier of claim 1, where the first air filter and the second air filter each define a width of 20 inches, a height of 20 inches, and a depth of 1 inch.

7. The air purifier of claim 1, wherein the UV light is located at a bottom of the air purifying compartment between the first air filter and the second air filter.

8. The air purifier of claim 1, wherein the controller has a communication system that is configured to be in communication with a communication network.

9. The air purifier of claim 8, wherein the controller is configured to receive data through the communication system from one or more smart home devices that are in communication with the communication network.

10. An air purification system comprising:
    an air purifier that includes:
       a controller,
       a front and a rear housing that are connected,
       a fan,
       an air purifying assembly that is within the rear housing that includes a first air filter, a second air filter, a UV light, an odor absorber, and a fragrance diffuser;
       an air displacement mechanism within the front housing and in communication with the controller, and
       a power supply that is in communication with the controller;
       a communication system that is in communication with the controller;
       one or more sensors in that are in communication with the controller; and
       one or more buttons that are in communication with the controller,
    wherein the first air filter is restrained vertically within the rear housing using a first set of filter holders that define a first filter holder axis and are attached to a right side and a left side of the rear housing,
    wherein the second air filter is restrained at an offset angle to the first air filter within the rear housing using a second set of filter holders that define a second filter holder axis and are attached to the right side and the left side of the rear housing,
    wherein the first and the second filter axes define a filter angle that is nonzero, and
    wherein the communication system is configured to be in communication with a communication network.

11. The air purification system of claim 10, wherein the controller is configured to receive data from one or more smart home devices through the communication system.

12. The air purification system of claim 10, wherein a first sensor of the one or more sensors is a dust sensor.

13. The air purification system of claim 12, wherein the controller is configured to use data from the dust sensor to determine an optimal operational cycle for the air purifier.

14. The air purification system of claim 13, wherein the optimal operational cycle for the air purifier relates to both an intensity the fan operates at and a length of time the fan operates for during each operational cycle.

15. The air purification system of claim 10, wherein the controller and the one or more buttons are located on a smartphone that is in communication with the communication network.

16. The air purification system of claim 10, wherein communication system is configured to be in communication with a communication network that is a Wi-Fi network.

17. A method of operating an air purifier, comprising the steps of:
    providing an air purifier with a front and rear housing that are connected to each other, a power supply, a controller, one or more sensors, a fan, and an air purifying assembly that is within the rear housing in an air purifying compartment that includes a first air filter and a second air filter that are mounted to the rear housing such that they are disposed at a non-parallel angle from each other, a UV light, an odor absorber, and a fragrance diffuser;
    initiating the fan for a set amount of time determined by the controller based on an air quality measurement from one or more sensors;
    operating the fan by using the controller to send power from the power supply to the fan such that the fan pulls air through the air purifying assembly that has a first, second, third, fourth zone; and
    stopping the fan by the controller stopping the power to the fan after a set amount of time has elapsed.

18. The method of operating an air purifier of claim 17, wherein the first zone of the air purifier is an activated carbon air filter, the second zone of the air purifier is a UV light, the third zone of the air purifier is a high-efficiency particulate filter, and the fourth zone of the air purifier is a fragrance diffuser and an odor absorber.

19. The method of operating an air purifier of claim 17, wherein the controller also uses user inputs from a smartphone when determining an optimal operational cycle.

20. The method of operating an air purifier of claim 17, wherein the method includes the step of the air purifier entering a rest state after the controller stops the power to the fan.

* * * * *